(12) United States Patent
West et al.

(10) Patent No.: US 7,517,016 B1
(45) Date of Patent: Apr. 14, 2009

(54) VEHICLE CHILD SEAT

(76) Inventors: Eugene West, 99 Riverside Run Dr., Indian Head, MD (US) 20640; Frankie West, 99 Riverside Run Dr., Indian Head, MD (US) 20640; Rosemary West, 99 Riverside Run Dr., Indian Head, MD (US) 20640

( * ) Notice: Subject to any disclaimer, the term of this patent is extended or adjusted under 35 U.S.C. 154(b) by 0 days.

(21) Appl. No.: 11/645,883

(22) Filed: Dec. 27, 2006

Related U.S. Application Data

(60) Provisional application No. 60/753,948, filed on Dec. 27, 2005.

(51) Int. Cl.
*A47C 15/00* (2006.01)
(52) U.S. Cl. .................... 297/236; 297/232; 297/240
(58) Field of Classification Search ............. 297/410, 297/232, 234, 237, 236, 240, 235, 238, 254
See application file for complete search history.

(56) References Cited

U.S. PATENT DOCUMENTS

| | | | |
|---|---|---|---|
| 2,966,201 A | 12/1960 | Strahler | |
| 4,555,135 A * | 11/1985 | Freeland | 297/105 |
| 4,722,568 A | 2/1988 | Irvin | |
| 4,768,827 A * | 9/1988 | Musgrove | 297/236 |
| 4,900,087 A | 2/1990 | Crisp | |
| 5,121,964 A * | 6/1992 | Fourrey et al. | 297/237 |
| 5,260,684 A * | 11/1993 | Metzmaker | 340/457.1 |
| 5,282,666 A * | 2/1994 | Demick et al. | 297/237 |
| 5,282,667 A | 2/1994 | Elton et al. | |
| D344,639 S | 3/1994 | Evans, Jr. | |
| 5,366,270 A | 11/1994 | Heussner et al. | |
| 5,380,060 A | 1/1995 | Sponsler et al. | |
| 5,383,707 A | 1/1995 | Osenkowski et al. | |
| 5,385,384 A | 1/1995 | Gierman et al. | |
| 5,398,997 A | 3/1995 | McFalla | |
| 5,449,216 A | 9/1995 | Gierman et al. | |
| 5,542,742 A * | 8/1996 | Fulgenzi et al. | 297/237 |
| 5,553,918 A * | 9/1996 | Baret et al. | 297/237 |
| 5,775,771 A | 7/1998 | La Cour et al. | |
| 5,806,926 A * | 9/1998 | Parsons | 297/238 |
| 5,899,534 A | 5/1999 | Gray | |
| 6,089,662 A * | 7/2000 | Lambert et al. | 297/238 |
| 6,109,686 A * | 8/2000 | Fox | 297/105 |
| 6,126,238 A * | 10/2000 | Klindworth | 297/410 |
| 2002/0030394 A1 | 3/2002 | Ito | |
| 2003/0193220 A1* | 10/2003 | Jensen | 297/146 |
| 2006/0214479 A1* | 9/2006 | Dwire et al. | 297/163 |
| 2007/0013212 A1* | 1/2007 | Meister | 297/115 |

* cited by examiner

*Primary Examiner*—David Dunn
*Assistant Examiner*—James Alex

(57) ABSTRACT

A vehicle child seat includes a primary backrest with a hollow passageway formed therein. A headrest is vertically adapted between raised and lowered positions, and has a lower portion housed within the passageway and an upper portion disposed above the primary backrest. An auxiliary backrest is connected to the primary backrest, and is articulated rearwardly of the primary backrest when the headrest is raised. A base section is coupled to the primary backrest and has a hollow chamber formed therein, and further has a trapdoor connected to an anterior end thereof. A baby seat section is removably housed within the chamber and adaptable between vertical and horizontal positions about a fulcrum axis defined anterior of the primary backrest. The baby seat section and the trapdoor are independently and simultaneously pivotal so the caregiver can quickly extract the baby seat section from the chamber.

15 Claims, 6 Drawing Sheets

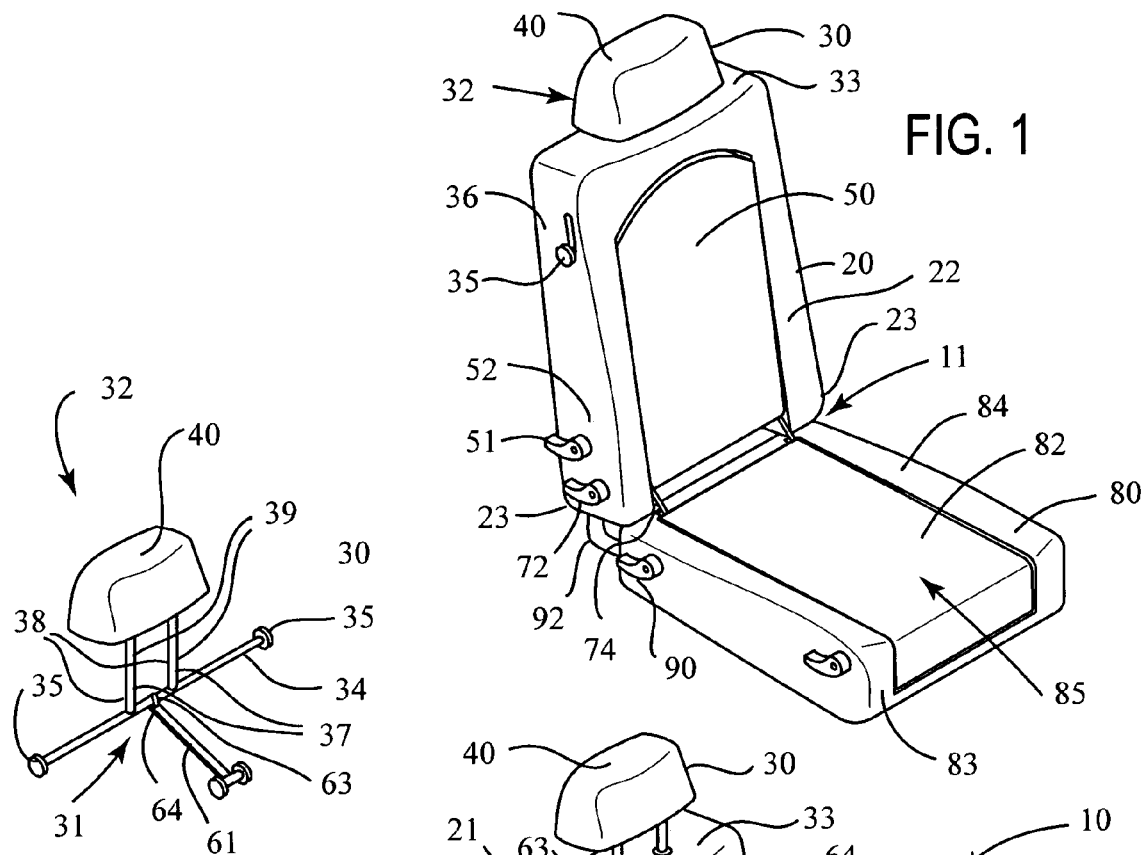
FIG. 1
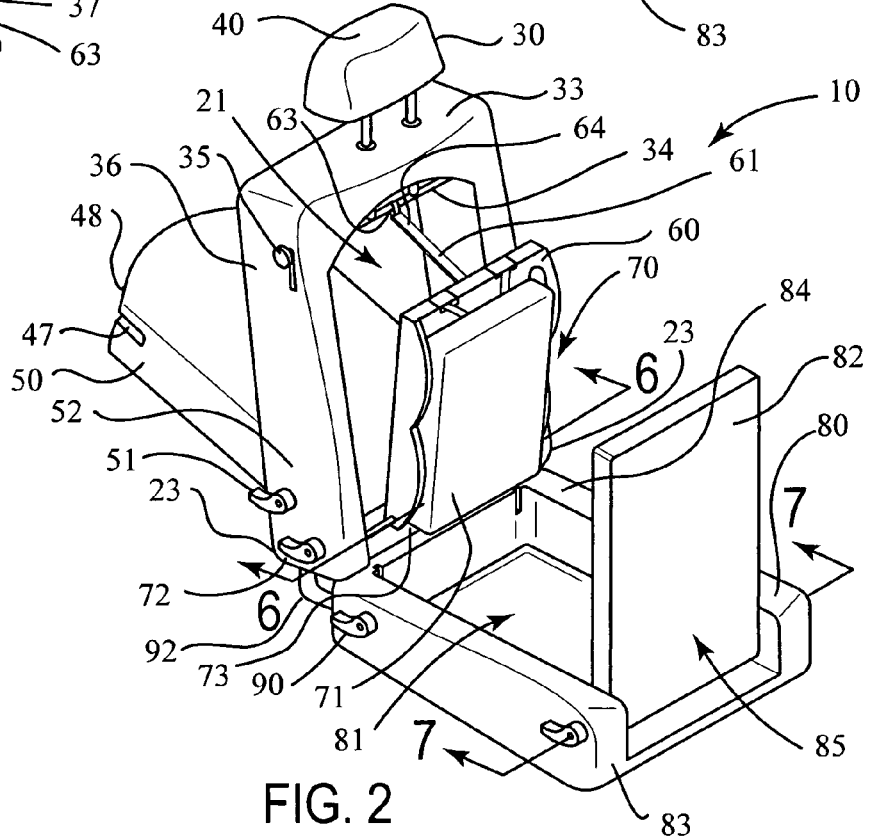
FIG. 2A
FIG. 2

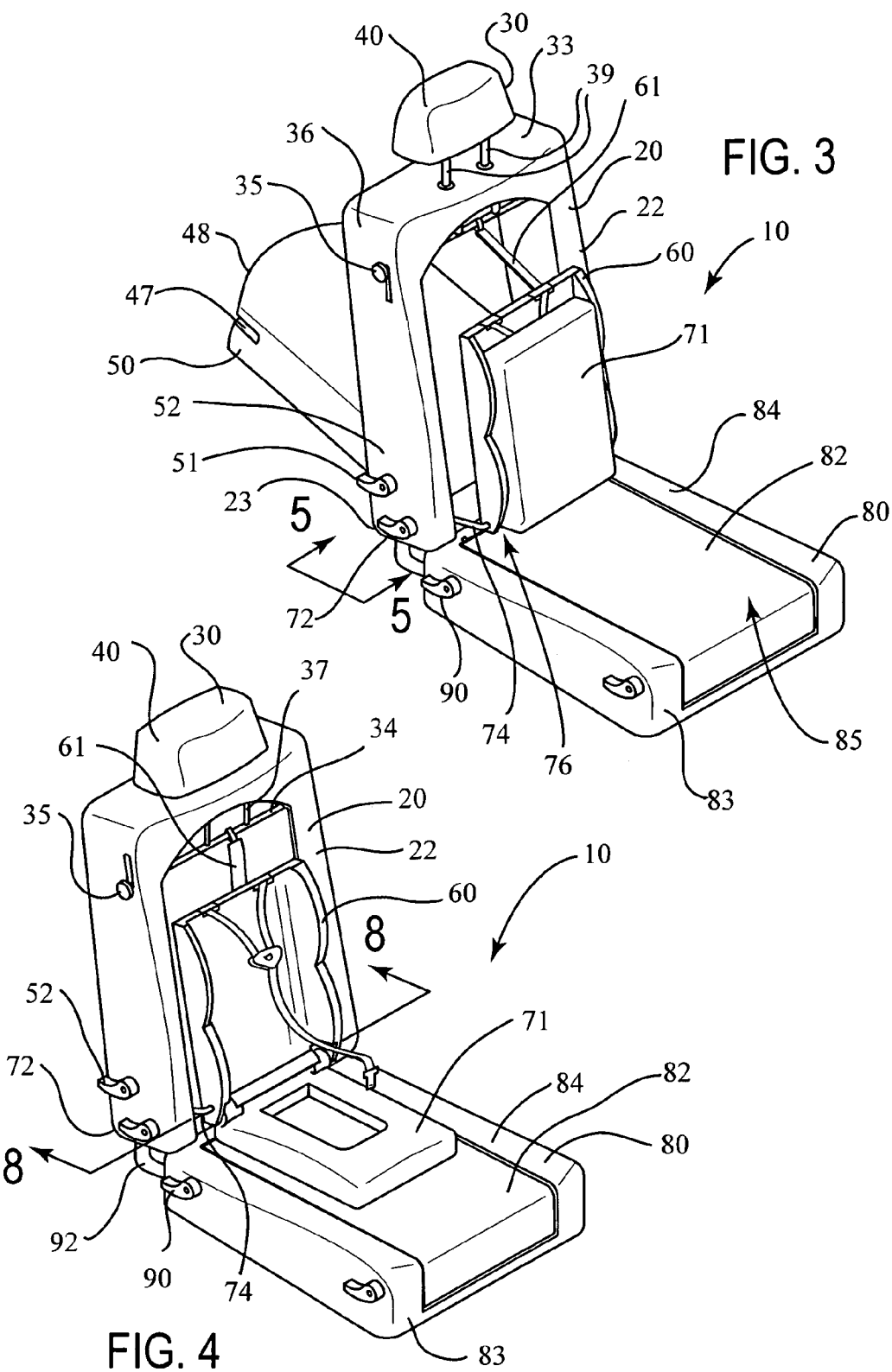

VEHICLE CHILD SEAT

CROSS REFERENCE TO RELATED APPLICATIONS

This application claims the benefit of U.S. Provisional Application No. 60/753,948, filed Dec. 27, 2005, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to child seats and, more particularly, to a vehicle child seat for allowing a child and an adult to interchangeably occupy a common seat area.

2. Prior Art

By way of background, it is becoming increasingly desirable for automotive vehicles to provide a child restraint seat disposed integrally in the adult passenger seat for restraining a child in the vehicle. It is further desirable to provide a child seat which folds or collapses to a storage position as part of the adult passenger seat such that the adult seat maintains its usefulness and yet the child seat is readily accessible. Virtually all automotive passenger type motor vehicles are now equipped with safety belt restraint systems for physically restraining the seat occupant when the vehicle is subjected to a high rate of deceleration which may occur, for example, during a motor vehicle collision.

While such conventional safety belt restraint systems are well suited for restraining adult passengers, it is a common practice to use a portable (i.e., "add-on") child restraint seat having a belt-type harness for children under a given age and weight. As is known, such portable child seats are placed on top of the vehicle seat and secured thereto using the existing vehicular safety belt restraint system.

In an effort to minimize the inconvenience associated with installing and/or stowing portable child seats, some automotive passenger type motor vehicles are now available with seating arrangements that have a "built-in" or integral child restraint seat integrated into the backrest of an otherwise conventional seat. When the child seat is stowed, the seating arrangement accommodates an adult in a normal seated position while preserving the overall cosmetic appearance and comfort of the vehicle seat. When needed, the integral child seat can be deployed by rotating a seat member to a lowered operative position and elevating a headrest member to a raised operative position, thereby exposing a belt-type harness restraint provided for physically restraining a child within the seat. Following use, the integral child seat can be stowed by lowering the headrest member and raising the seat member to their respective stowage positions concealed within the backrest. It is also common to utilize a latching mechanism for latching the integral child seat in its stowed position.

One prior art example discloses a seat belt system for restraining a vehicle occupant that includes a retractor, a first locking tongue, a second locking tongue and a buckle. The retractor includes a spool which is rotatable in a webbing winding direction and a webbing unwinding direction. The retractor further includes a lock bar which blocks rotation of the spool in the webbing unwinding direction when the lock bar is in a locking position. The first locking tongue is connected with one length of seat belt webbing. The second locking tongue is connected with another length of seat belt webbing. The buckle has a locking mechanism for locking the first and second tongues and in a buckle. The seat belt system further includes an actuator for moving the lock bar in the retractor into the locking position in response to locking of the first and second tongues and in the buckle. The actuator moves the lock bar into the locking position only in response to locking of both the first and second tongues and in the buckle. Unfortunately, this prior art example does not stow within the bottom portion of an existing seat, thus the back rest is uncomfortable for use by an adult.

Another prior art example shows an integral child restraint seat having selected portions lined with an energy absorbing material. When a child occupant strikes and/or loads into the child seat, a portion of the total energy dissipated is absorbed by the energy absorbing material. Thus, the overall energy absorbed by the child occupant is reduced. The integral child seat also provides a unique seat latching arrangement including a pliable member that extends from the seat member and operatively engages a stationary portion of the child seat to latch the seat member in a stowed position. This pliable member also provides an integral protective cover that extends from the seat member and covers a portion of the vehicular seat, thereby preventing the vehicular seat from becoming soiled. Unfortunately, this pliable member is uncomfortable during use by an adult, and also does not match the existing upholstery of the seat, thereby presenting a mismatched appearance.

Accordingly, a need remains for a vehicle child seat in order to overcome the above-noted shortcomings. The present invention satisfies such a need by providing an assembly that is convenient and easy to use, is lightweight yet durable in design, and allows a child and an adult to interchangeably occupy a common seat area. The assembly provides parents and caregivers with a means of keeping an infant safely restrained when traveling in a vehicle. Such an assembly is integrated into the design of a vehicle seat, thus ensuring secure and sound installation. A heavy duty, three-point safety harness ensures that an infant is securely restrained at all times, and effectively prevents the child from being thrown from the seat in case of sudden stops or collisions.

BRIEF SUMMARY OF THE INVENTION

In view of the foregoing background, it is therefore an object of the present invention to provide an assembly for a vehicle child seat. These and other objects, features, and advantages of the invention are provided by a vehicle child seat for allowing a child and an adult to interchangeably occupy a common seat area.

The assembly includes a primary backrest that has a hollow passageway formed therein. Such a primary backrest effectively defines a shape of the uppermost section of a car seat and further has bottom ends advantageously spaced above a horizontal plane.

The assembly further includes a headrest section vertically adapted between raised and lowered positions. Such a headrest section has a lower portion conveniently housed within the passageway and an upper portion effectively disposed above a top surface of the primary backrest. The headrest section further includes a linear shaft traversing horizontally through the passageway and terminating exterior thereof.

Such a linear shaft has opposed ends exposed on outer surfaces of the primary backrest. A plurality of vertical bars has lower ends connected to the linear shaft and upper ends effectively penetrating upwardly from the top surface of the primary backrest.

The headrest section further includes a headrest directly coupled to the upper ends of the bars, wherein the linear shaft advantageously rises and falls within the passageway when the headrest is raised and lowered in such a manner that the auxiliary backrest (herein described below) is conveniently allowed to fit within the passageway after the linear shaft is elevated to the uppermost position. Such an auxiliary backrest has a groove formed along a top end thereof and receives the linear shaft such that the auxiliary backrest is effectively prevented from articulating rearwardly when the linear shaft is interfitted within the groove.

The assembly further includes an auxiliary backrest pivotally connected to the primary backrest. Such an auxiliary backrest is selectively articulated rearwardly of the primary backrest when the headrest section is raised to an uppermost portion of the passageway. The auxiliary backrest is shaped substantially similar to the passageway and is completely contained therein when the headrest is in the lowered position. A lever is positioned on an exterior face of the primary backrest for conveniently allowing a caregiver to bias the auxiliary backrest between vertical and horizontal positions. Such a lever and the auxiliary backrest are moveable while the baby seat section (herein described below) is connected to the linear shaft.

The assembly further includes a base section coupled to the primary backrest and seated directly on the horizontal plane such that the base section conveniently remains disposed below the primary backrest. Such a base section has a hollow chamber formed therein and further has a trapdoor pivotally connected to an anterior end thereof. The base section effectively defines a shape of the lowermost section of the car seat.

The assembly further includes a baby seat section removably housed within the chamber and pivotally adaptable between vertical and horizontal positions, wherein the baby seat section pivots about a fulcrum axis defined anterior of the primary backrest. Such a baby seat section and the trapdoor are independently and simultaneously pivotal such that the caregiver can quickly extract the baby seat section from the chamber as needed. The baby seat section includes a backrest that has a strap anchored to a posterior surface thereof. Such a strap includes a hook connected to a distal end thereof. Such a hook is attached to the linear shaft when the backrest is biased to the vertical position such that the backrest is advantageously maintained at a substantially vertical position and effectively prevented from prematurely biasing to the horizontal position during operating conditions.

The baby seat section further includes a seat pivotally connected to a bottom end of the backrest. Such a seat is conveniently disposed horizontally above, and abutted against, a top surface of the trapdoor when the trapdoor is articulated to the closed position. A pair of actuating levers is directly connected to opposed outside faces of the primary backrest. Such actuating levers conveniently bias the seat forwardly from the backrest such that a rear most edge of the seat becomes advantageously displaced in front of the pair of actuating levers after the seat is biased to the horizontal position such that the baby seat section is completely stowed within the chamber during non-operating conditions. A curvilinear shaft has opposed ends directly connected to the pair of actuating levers and traverses through a rear portion of the baby seat section. Such a curvilinear shaft is partially housed within the chamber when the baby seat section is adapted to the horizontal position.

The assembly further includes a control lever directly seated on an outside face of the base section, and a pair of L-shaped stabilizing arms that have opposed ends directly coupled to the control lever and the primary backrest respectively. The base section and the primary backrest effectively maintain a fixed spatial relationship while the baby seat section and the auxiliary backrest are conveniently pivoted between the horizontal and vertical positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective of a vehicle child seat, in accordance with the present invention;

FIG. 2 is a perspective view of the assembly shown in FIG. 1 showing the baby seat section removed from the base section;

FIG. 2A is a perspective view of the headrest section;

FIG. 3 is a perspective view of the assembly shown in FIG. 2 showing the trapdoor closed;

FIG. 4 is a perspective view of the assembly shown in FIG. 3 showing the baby seat section in a lowered position;

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 5:
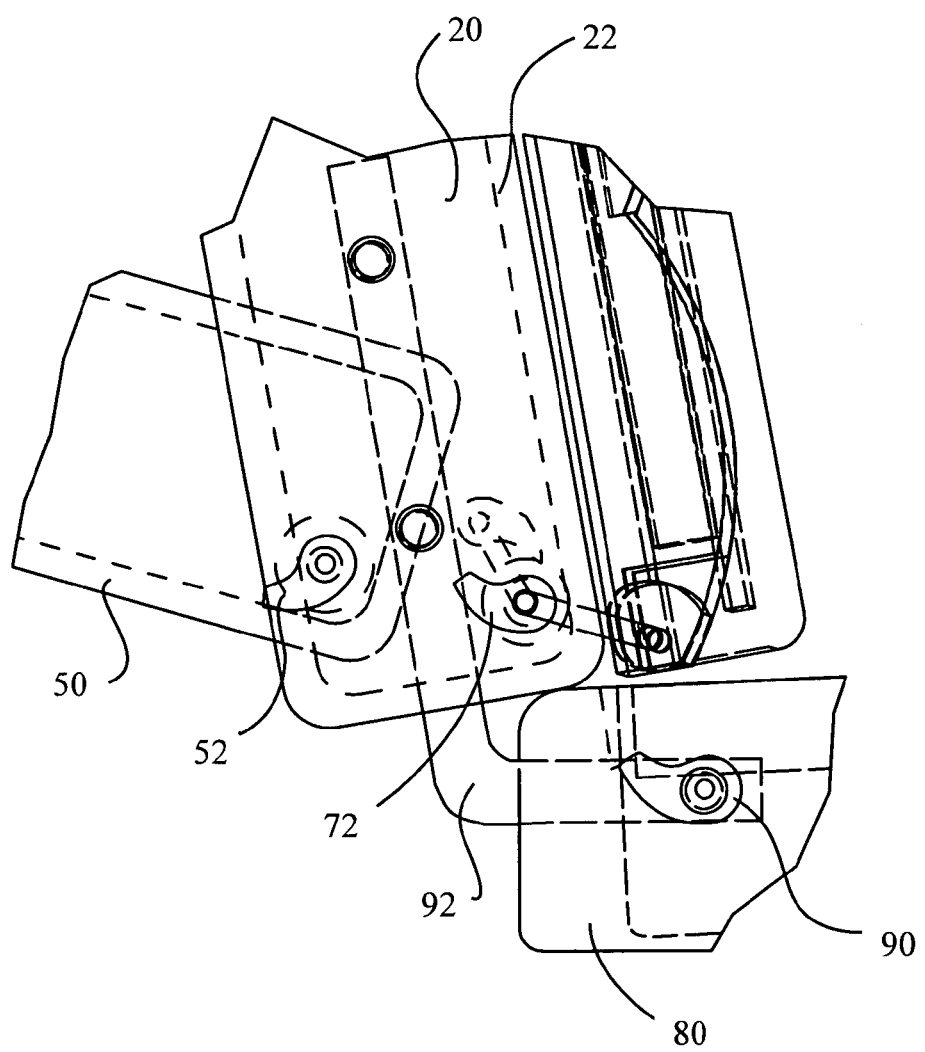
FIG. 5 is a side elevational view of the auxiliary backrest biased to a lowered position.
Figure 6:
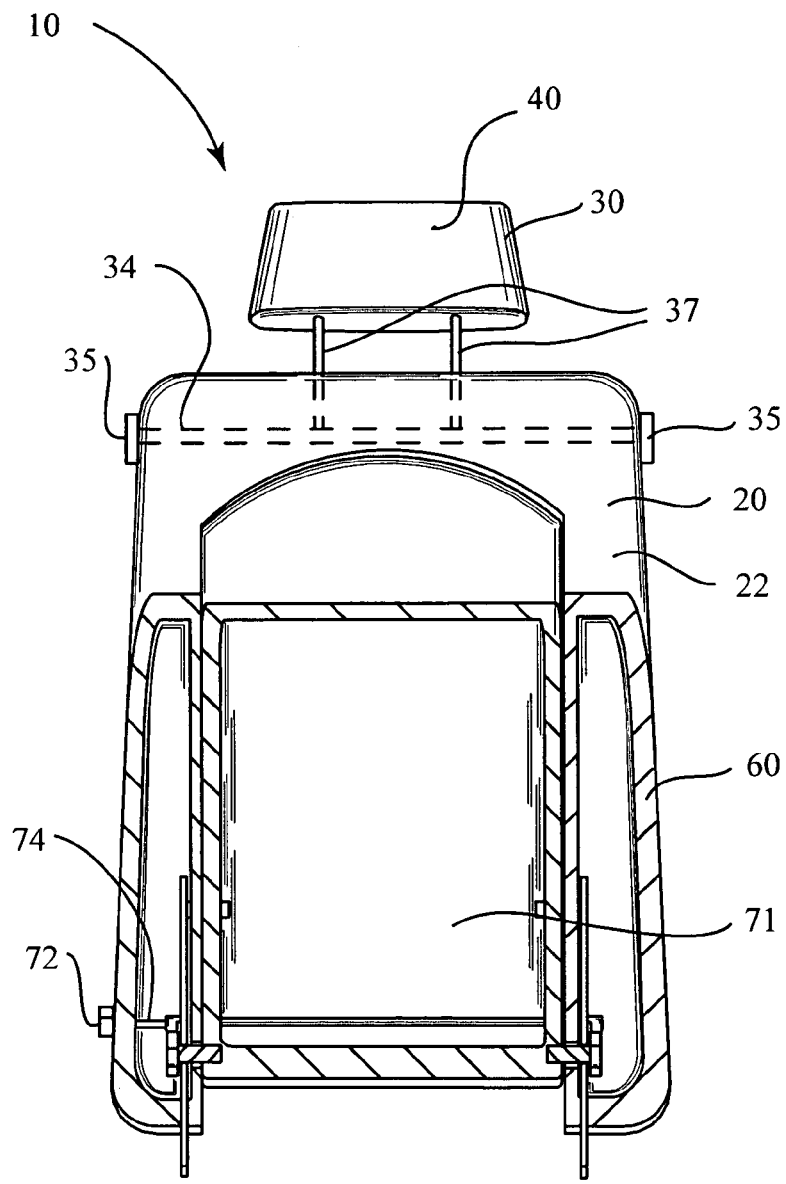
FIG. 6 is a cross sectional view of the assembly shown in FIG. 2, taken along line 6-6.
Figure 7:
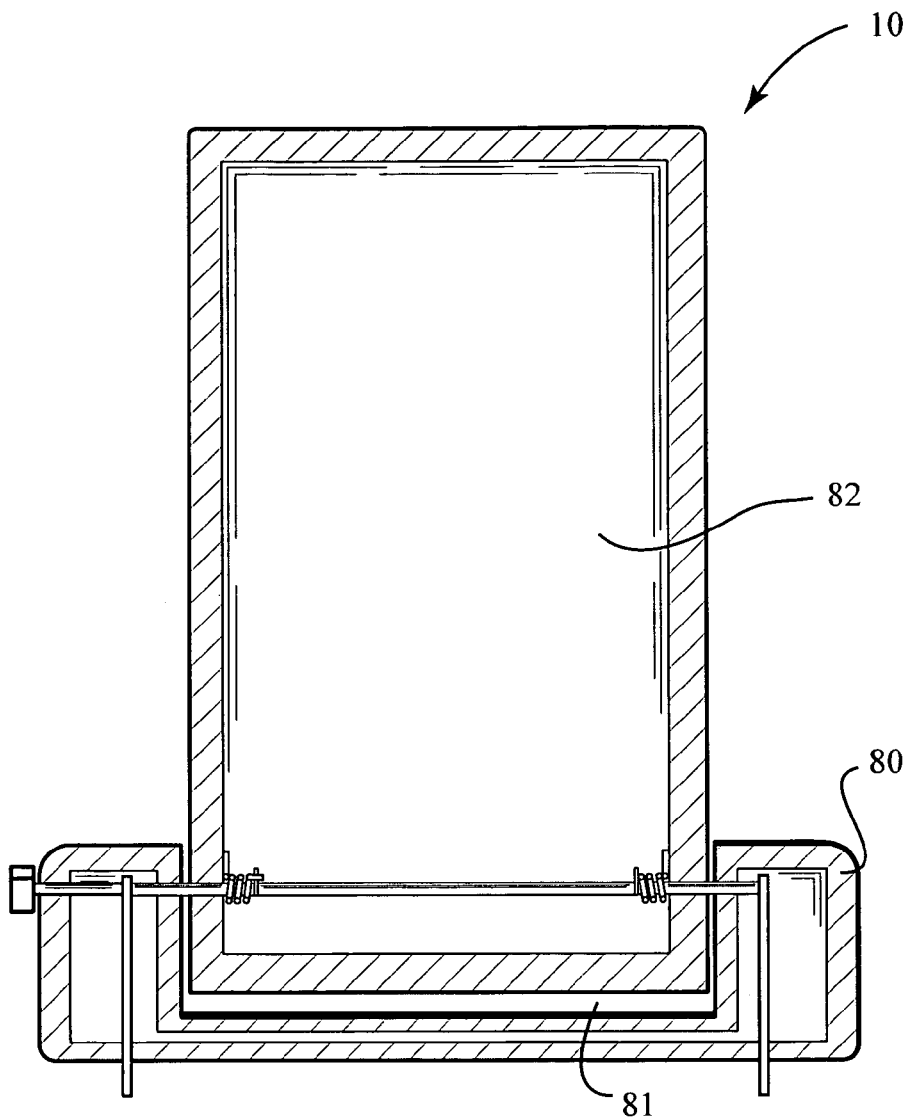
FIG. 7 is a cross sectional view of the assembly shown in FIG. 2, taken along line 7-7.
Figure 8:
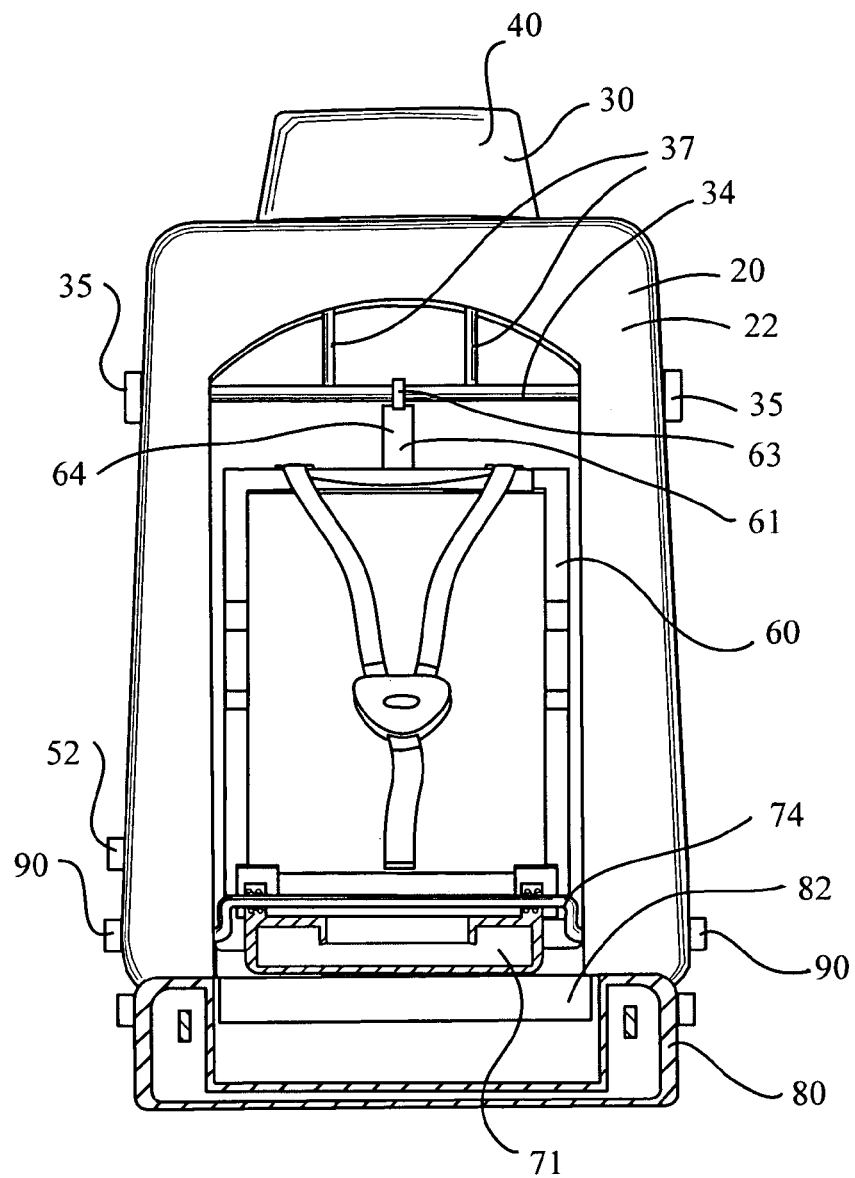
FIG. 8 is a cross sectional view of the assembly shown in FIG. 4, taken along line 8-8.

The assembly of this invention is referred to generally in FIGS. 1-8 by the reference numeral 10 and is intended to provide a vehicle child seat. It should be understood that the assembly 10 may be used to provide a seat in many different types of vehicles and for many different sizes of children and should not be limited in use to providing a seat only for those types of vehicles and children described herein.

Referring initially to FIGS. 1, 2, 3, 4, 5, 6, and 8, the assembly 10 includes a primary backrest 20 that has a hollow passageway 21 formed therein. Such a primary backrest 20 defines a shape of the uppermost section 22 of a car seat 11 and further has bottom ends 23 advantageously spaced above a horizontal plane. Such spacing allows the primary backrest 20 to be adjusted as desired by a user without being impeded by frictional pressure that would be created if the bottom ends 23 of the primary backrest 20 were located below a horizontal plane.

Referring to FIGS. 1, 2, 2A, 3, 4, 6 and 8, the assembly 10 further includes a headrest section 30 vertically adapted between raised and lowered positions. Such a headrest section 30 has a lower portion 31 housed within the passageway 21 and an upper portion 32 disposed above a top surface 33 of the primary backrest 20. The headrest section 30 further includes a linear shaft 34 traversing horizontally through the passageway 21 and terminating exterior thereof. Such a linear shaft 34 has opposed ends 35 exposed on outer surfaces 36 of the primary backrest 20. A plurality of vertical bars 37 has lower ends 38 connected to the linear shaft 34 and upper ends 39 penetrating upwardly from the top surface 33 of the primary backrest 20. Such vertical bars 37 are necessary for providing a connection between the headrest 40 (herein described below) and the linear shaft 34, thus allowing a user to move the linear shaft 34 within the passageway 21 by manipulating the headrest 40.

Again referring to FIGS. 1, 2, 2A, 3, 4, 6 and 8, the headrest section 30 further includes a headrest 40 directly coupled to the upper ends 39 of the vertical 37 bars, without the use of intervening elements, wherein the linear shaft 34 advantageously rises and falls within the passageway 21 when the headrest 40 is raised and lowered, which is essential such that the auxiliary backrest 50 (herein described below) is allowed to fit within the passageway 21 after the linear shaft 34 is elevated to the uppermost position. Such an auxiliary backrest 50 has a groove 51 formed along a top end 52 thereof and receives the linear shaft 34, which is critical such that the auxiliary backrest 50 is prevented from articulating rearwardly when the linear shaft 34 is interfitted within the groove 51. The headrest 40 provides the function of allowing a user to raise and lower the linear shaft 34 when using the assembly 10, as well as protecting an adult user head from injury in the event of an accident when the assembly 10 is not in use.

Referring to FIGS. 1, 2, 3, 5 and 6, the assembly 10 further includes an auxiliary backrest 50 pivotally connected to the primary backrest 20. Such an auxiliary backrest 50 is selectively articulated rearwardly of the primary backrest 20 when the headrest 40 is raised to an uppermost portion of the passageway 21. Rearward articulation of the auxiliary backrest 50 allows a user to bias the child seat backrest 60 (herein described below) to a vertical position for use as intended. The auxiliary backrest 50 is shaped substantially similar to the passageway 21 and is completely contained therein when the headrest 40 is in the lowered position. The auxiliary backrest 50 provides an additional support for the child seat backrest 60 when in use, as well as support for an adult back when the assembly 10 is not in use. A lever 51 is positioned on an exterior face 52 of the primary backrest 20, which is crucial for allowing a caregiver to bias the auxiliary backrest 20 between vertical and horizontal positions. Such a lever 51 and the auxiliary backrest 20 are moveable while the baby seat section 70 (herein described below) is connected to the linear shaft 34.

Referring to FIGS. 1, 2, 3, 4, 5, 7 and 8, the assembly 10 further includes a base section 80 coupled to the primary backrest 20 and seated directly on the horizontal plane, without the use of intervening elements, which is vital such that the base section 80 remains disposed below the primary backrest 20. Such a base section 80 has a hollow chamber 81 formed therein and further has a trapdoor 82 pivotally connected to an anterior end 83 thereof. The base section 80 defines a shape of the lowermost section 84 of the car seat 11. The base section 80 provides an additional support for the baby seat section 70 when in use, as well as support for an adult backside when the assembly 10 is not in use.

Referring to FIGS. 2, 2A, 3, 4, 6 and 8, the assembly 10 further includes a baby seat section 70 removably housed within the chamber 81 and pivotally adaptable between vertical and horizontal positions, wherein the baby seat section 70 pivots about a fulcrum axis defined anterior of the primary backrest 20. Such a baby seat section 70 and the trapdoor 82 are independently and simultaneously pivotal, which is necessary such that the caregiver can quickly extract the baby seat section 70 from the chamber 81 as needed. The baby seat section 70 includes a child seat backrest 60 that has a strap 61 anchored to a posterior surface 62 thereof. Such a strap 61 includes a hook 63 connected to a distal end 64 thereof. Such a hook 63 is attached to the linear shaft 34 when the child seat backrest 60 is biased to the vertical position, which is important such that the child seat backrest 60 is advantageously maintained at a substantially vertical position and prevented from prematurely biasing to the horizontal position during operating conditions.

Again referring to FIGS. 2, 3, 4, 6 and 8, the baby seat section 70 further includes a seat 71 pivotally connected to a bottom end 65 of the child seat backrest 60. Such a seat 71 is disposed horizontally above, and abutted against, a top surface 85 of the trapdoor 82 when the trapdoor 82 is articulated to the closed position. A pair of actuating levers 72 is directly connected to opposed exterior faces 52 of the primary backrest 20, without the use of intervening elements. Such actuating levers 72 bias the seat 71 forwardly from the auxiliary and primary backrests 50, 20 respectively, which is essential such that a rearmost edge 73 of the seat 71 becomes advantageously displaced in front of the pair of actuating levers 72 after the seat 71 is biased to the horizontal position, which is critical such that the baby seat section 70 is completely stowed within the chamber 81 during non-operating conditions.

Referring to FIGS. 1, 2, 3, 4 and 8, such a biasing is necessary to create the space needed for the child seat backrest 60 and the baby seat section 70 to move forwardly and downwardly in such a manner that the child seat backrest 60 and the baby seat section 70 can be lowered into the chamber 81 and contained therein while the trapdoor 82 is closed. A curvilinear shaft 74 has opposed ends directly connected to the pair of actuating levers 72, without the use of intervening elements, and traverses through a rear portion 76 of the baby seat section 70. Such a curvilinear shaft 74 is partially housed within the chamber 81 when the baby seat section 70 is adapted to the horizontal position. The curvilinear shaft 74 provides the necessary space whereby the child seat backrest 60 and child seat section 70 is moved the required forward distance from the primary backrest 20 and the auxiliary backrest 50 respectively.

Referring to FIGS. 1, 2, 3, 4, 5 and 8, the assembly 10 further includes a control lever 90 directly seated on an outside face 52 of the base section 80, without the use of intervening elements, and a pair of L-shaped stabilizing arms 92 that have opposed ends directly coupled to the control lever 90 and the primary backrest 20 respectively, without the use of intervening elements. Such a control lever 90 allows a user to bias the primary backrest 20 to alternate positions as desired by the user for comfort or necessity. The base section 91 and the primary backrest 20 maintain a fixed spatial relationship while the baby seat section 70 and the auxiliary backrest 50 are pivoted between the horizontal and vertical positions.

The curvilinear shaft 74 provides the unexpected benefit of allowing the child seat backrest 60 and baby seat section 70 to be raised to a position for use as intended, while alternately being lowered to a position in which the child seat backrest 60 and baby seat section 70 are completely contained within the chamber 81 when not in use and the car seat is available for use by an adult, thereby overcoming the prior art shortcomings.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle child seat for allowing a child and an adult to interchangeably occupy a common seat area, said vehicle child seat comprising:

a primary backrest having a hollow passageway formed therein, said primary backrest defining a shape of the uppermost section of a car seat, said primary back rest further having bottom ends spaced above a horizontal plane;

a headrest section vertically adapted between raised and lowered positions, said headrest section having a lower portion housed within said passageway and an upper portion disposed above a top surface of said primary backrest;

an auxiliary backrest pivotally connected to said primary backrest, wherein said auxiliary backrest is selectively articulated rearwardly of said primary backrest after said headrest section is elevated to an uppermost portion of said passageway;

a base section coupled to said primary backrest and seated directly on the horizontal plane such that said base section remains disposed below said primary backrest, said base section having a hollow chamber formed therein and further having a trapdoor pivotally connected to an anterior end thereof, said base section defining a shape of the lowermost section of the car seat; and a baby seat section removably housed within said chamber and pivotally adaptable between vertical and horizontal positions, wherein said baby seat section pivots about a fulcrum axis defined anterior of said primary backrest;

wherein said headrest section comprises a linear shaft traversing horizontally through said passageway and terminating exterior thereof, said linear shaft having opposed ends exposed on outer surfaces of said primary backrest;

a plurality of vertical bars having opposed ends connected to said linear shaft and penetrating upwardly from said top surface of said primary backrest; and a headrest directly coupled to said bars respectively, wherein said linear shaft rises and falls within said passageway when said headrest is raised and lowered in such a manner that said auxiliary backrest is allowed to fit within said passageway after said linear shaft is elevated to the uppermost position, said auxiliary backrest having a groove formed along a top end thereof and receiving said linear shaft such that said auxiliary backrest is prevented from articulating rearwardly when said linear shaft is interfitted within said groove.

2. The vehicle child seat of claim 1, wherein said auxiliary backrest comprises:

a lever positioned on an exterior face of said primary backrest for allowing a caregiver to bias said auxiliary backrest between vertical and horizontal positions, said lever and said auxiliary backrest being moveable while said baby seat section is connected to said linear shaft.

3. The vehicle child seat of claim 1, wherein said baby seat section comprises:

a backrest having a strap anchored to a posterior surface thereof, said strap including a hook connected to a distal end thereof, said hook being attached to said linear shaft when said backrest is biased to the vertical position such that said backrest is maintained at a substantially vertical position and prevented from prematurely biasing to the horizontal position during operating conditions;

a seat pivotally connected to a bottom end of said backrest, said seat being disposed horizontally above and abutted against a top surface of said trapdoor when said trapdoor is articulated to the closed position; and a pair of actuating levers directly connected to opposed outside faces of said primary backrest, said actuating levers biasing said seat forwardly from said backrest such that a rear most edge of said seat becomes displaced in front of said pair of actuating levers after said seat is biased to the horizontal position such that said baby seat section is completely stowed within said chamber during non-operating conditions.

4. The vehicle child seat of claim 3, wherein said baby seat section further comprises:

a curvilinear shaft having opposed ends directly connected to said pair of actuating levers and traversing through a rear portion of said baby seat section, wherein said curvilinear shaft is partially housed within said chamber when said baby seat section is adapted to the horizontal position.

5. The vehicle child seat of claim 3, further comprising:

a control lever directly seated on an outside face of said base section; and a pair of L-shaped stabilizing arms having opposed ends directly coupled to said control lever and said primary backrest respectively;

wherein said base section and said primary backrest maintain a fixed spatial relationship while said baby seat section and said auxiliary backrest are pivoted between the horizontal and vertical positions.

6. A vehicle child seat for allowing a child and an adult to interchangeably occupy a common seat area, said vehicle child seat comprising:
- a primary backrest having a hollow passageway formed therein, said primary backrest defining a shape of the uppermost section of a car seat, said primary back rest further having bottom ends spaced above a horizontal plane;
- a headrest section vertically adapted between raised and lowered positions, said headrest section having a lower portion housed within said passageway and an upper portion disposed above a top surface of said primary backrest;
- an auxiliary backrest pivotally connected to said primary backrest, wherein said auxiliary backrest is selectively articulated rearwardly of said primary backrest after said headrest section is elevated to an uppermost portion of said passageway;
- a base section coupled to said primary backrest and seated directly on the horizontal plane such that said base section remains disposed below said primary backrest, said base section having a hollow chamber formed therein and further having a trapdoor pivotally connected to an anterior end thereof, said base section defining a shape of the lowermost section of the car seat; and
- a baby seat section removably housed within said chamber and pivotally adaptable between vertical and horizontal positions, wherein said baby seat section pivots about a fulcrum axis defined anterior of said primary backrest, wherein said baby seat section and said trapdoor are independently and simultaneously pivotal such that the caregiver can quickly extract said baby seat section from said chamber as needed;
- wherein said headrest section comprises
- a linear shaft traversing horizontally through said passageway and terminating exterior thereof, said linear shaft having opposed ends exposed on outer surfaces of said primary backrest;
- a plurality of vertical bars having opposed ends connected to said linear shaft and penetrating upwardly from said top surface of said primary backrest; and
- a headrest directly coupled to said bars respectively, wherein said linear shaft rises and falls within said passageway when said headrest is raised and lowered in such a manner that said auxiliary backrest is allowed to fit within said passageway after said linear shaft is elevated to the uppermost position, said auxiliary backrest having a groove formed along a top end thereof and receiving said linear shaft such that said auxiliary backrest is prevented from articulating rearwardly when said linear shaft is interfitted within said groove.

7. The vehicle child seat of claim 6, wherein said auxiliary backrest comprises:
- a lever positioned on an exterior face of said primary backrest for allowing a caregiver to bias said auxiliary backrest between vertical and horizontal positions, said lever and said auxiliary backrest being moveable while said baby seat section is connected to said linear shaft.

8. The vehicle child seat of claim 6, wherein said baby seat section comprises:
- a backrest having a strap anchored to a posterior surface thereof, said strap including a hook connected to a distal end thereof, said hook being attached to said linear shaft when said backrest is biased to the vertical position such that said backrest is maintained at a substantially vertical position and prevented from prematurely biasing to the horizontal position during operating conditions;
- a seat pivotally connected to a bottom end of said backrest, said seat being disposed horizontally above and abutted against a top surface of said trapdoor when said trapdoor is articulated to the closed position; and
- a pair of actuating levers directly connected to opposed outside faces of said primary backrest, said actuating levers biasing said seat forwardly from said backrest such that a rear most edge of said seat becomes displaced in front of said pair of actuating levers after said seat is biased to the horizontal position such that said baby seat section is completely stowed within said chamber during non-operating conditions.

9. The vehicle child seat of claim 8, wherein said baby seat section further comprises:
- a curvilinear shaft having opposed ends directly connected to said pair of actuating levers and traversing through a rear portion of said baby seat section, wherein said curvilinear shaft is partially housed within said chamber when said baby seat section is adapted to the horizontal position.

10. The vehicle child seat of claim 8, further comprising:
- a control lever directly seated on an outside face of said base section; and
- a pair of L-shaped stabilizing arms having opposed ends directly coupled to said control lever and said primary backrest respectively;
- wherein said base section and said primary backrest maintain a fixed spatial relationship while said baby seat section and said auxiliary backrest are pivoted between the horizontal and vertical positions.

11. A vehicle child seat for allowing a child and an adult to interchangeably occupy a common seat area, said vehicle child seat comprising:
- a primary backrest having a hollow passageway formed therein, said primary backrest defining a shape of the uppermost section of a car seat, said primary back rest further having bottom ends spaced above a horizontal plane;
- a headrest section vertically adapted between raised and lowered positions, said headrest section having a lower portion housed within said passageway and an upper portion disposed above a top surface of said primary backrest;
- an auxiliary backrest pivotally connected to said primary backrest, wherein said auxiliary backrest is selectively articulated rearwardly of said primary backrest after said headrest section is raised to an uppermost portion of said passageway, said auxiliary backrest being shaped substantially similar to said passageway and being completely contained therein when said headrest is in the lowered position;
- a base section coupled to said primary backrest and seated directly on the horizontal plane such that said base section remains disposed below said primary backrest, said base section having a hollow chamber formed therein and further having a trapdoor pivotally connected to an anterior end thereof, said base section defining a shape of the lowermost section of the car seat; and
- a baby seat section removably housed within said chamber and pivotally adaptable between vertical and horizontal positions, wherein said baby seat section pivots about a fulcrum axis defined anterior of said primary backrest, wherein said baby seat section and said trapdoor are independently and simultaneously pivotal such that the caregiver can quickly extract said baby seat section from said chamber as needed;
- wherein said headrest section comprises a linear shaft traversing horizontally through said passageway and terminating exterior thereof, said linear shaft having opposed ends exposed on outer surfaces of said primary backrest;

a plurality of vertical bars having opposed ends connected to said linear shaft and penetrating upwardly from said top surface of said primary backrest; and a headrest directly coupled to said bars respectively, wherein said linear shaft rises and falls within said passageway when said headrest is raised and lowered in such a manner that said auxiliary backrest is allowed to fit within said passageway after said linear shaft is elevated to the uppermost position, said auxiliary backrest having a groove formed along a top end thereof and receiving said linear shaft such that said auxiliary backrest is prevented from articulating rearwardly when said linear shaft is interfitted within said groove.

12. The vehicle child seat of claim 11, wherein said auxiliary backrest comprises:

a lever positioned on an exterior face of said primary backrest for allowing a caregiver to bias said auxiliary backrest between vertical and horizontal positions, said lever and said auxiliary backrest being moveable while said baby seat section is connected to said linear shaft.

13. The vehicle child seat of claim 11, wherein said baby seat section comprises:

a backrest having a strap anchored to a posterior surface thereof, said strap including a hook connected to a distal end thereof, said hook being attached to said linear shaft when said backrest is biased to the vertical position such that said backrest is maintained at a substantially vertical position and prevented from prematurely biasing to the horizontal position during operating conditions;

a seat pivotally connected to a bottom end of said backrest, said seat being disposed horizontally above and abutted against a top surface of said trapdoor when said trapdoor is articulated to the closed position; and a pair of actuating levers directly connected to opposed outside faces of said primary backrest, said actuating levers biasing said seat forwardly from said backrest such that a rear most edge of said seat becomes displaced in front of said pair of actuating levers after said seat is biased to the horizontal position such that said baby seat section is completely stowed within said chamber during non-operating conditions.

14. The vehicle child seat of claim 13, wherein said baby seat section further comprises:

a curvilinear shaft having opposed ends directly connected to said pair of actuating levers and traversing through a rear portion of said baby seat section, wherein said curvilinear shaft is partially housed within said chamber when said baby seat section is adapted to the horizontal position.

15. The vehicle child seat of claim 13, further comprising:

a control lever directly seated on an outside face of said base section; and a pair of L-shaped stabilizing arms having opposed ends directly coupled to said control lever and said primary backrest respectively;

wherein said base section and said primary backrest maintain a fixed spatial relationship while said baby seat section and said auxiliary backrest are pivoted between the horizontal and vertical positions.

* * * * *